United States Patent [19]

Baudot

[11] Patent Number: 5,582,373
[45] Date of Patent: Dec. 10, 1996

[54] SUPPORT STRUCTURE WITH FOLD-AWAY ARMS

[75] Inventor: Pascal Baudot, Chateauneuf de Grasse, France

[73] Assignee: Hewlett-Packard Company, Palo Alto, Calif.

[21] Appl. No.: 328,099

[22] Filed: Oct. 24, 1994

[51] Int. Cl.$^6$ .................................................... F16M 11/38
[52] U.S. Cl. ...................... 248/166; 248/176.1; 248/917
[58] Field of Search ...................................... 248/472, 473, 248/463, 464, 439, 436, 917, 924, 166, 168, 434, 188.6, 224.4, 176.1; 40/120, 152.1; 108/132

[56] References Cited

U.S. PATENT DOCUMENTS

| | | | |
|---|---|---|---|
| 1,051,047 | 1/1913 | Wood | 248/447 |
| 2,054,098 | 9/1936 | Rich | 108/132 |
| 2,505,615 | 4/1950 | Glass | 248/463 |
| 4,509,712 | 4/1985 | Moller | 248/464 |
| 5,128,662 | 7/1992 | Failla | 248/924 X |

*Primary Examiner*—Korie Chan

[57] ABSTRACT

A support stand for a display tablet comprises a body member and first and second arms each pivoted mounted on the body member. The arms are pivotal between an operative position in which they extend away from the body member and a folded-away position in which the arms lie close up against the body member with one arm overlying the other. The disposition of the arms is such that the arms can be selectively pivoted into their folded-away position with either arm outermost. The outermost arm has a resilient tongue that can snap engage with the lip of an aperture formed in the other arm thereby to hold the arms in their folded-away position.

7 Claims, 3 Drawing Sheets

5,582,373

SUPPORT STRUCTURE WITH FOLD-AWAY ARMS

FIELD OF THE INVENTION

The present invention relates to a support structure with fold-away arms and in particular, but not exclusively, to a support stand for a display tablet.

BACKGROUND OF THE INVENTION

Flat panel displays for computers are known in the art and are widely employed in portable computers where they often form part of a fold-up lid. Free-standing flat-panel displays are also known and these displays are used either flat on a support surface, or in an upright position supported by integral support arms.

Recently, sketch-on-image tablets have become more widely available. These tablets comprise a flat-panel display together with a sensor arrangement for sensing the position of a hand-held stylus over the display; as the stylus is moved by a user across the display, this movement is sensed and a corresponding line presented on the display. Clearly, when a sketch-on-image tablet is used for imputting stylus strokes into a computer, it is most often used in a flat position. However, such a tablet may also be used in an upright position and this may, indeed, be the preferred orientation when the user is primarily interested in viewing displayed material and only uses the stylus for command input (such as icon activation, 'drag-and drop' operations etc).

Because a user may wish to change the position of the tablet between a flat and an upright position, it is useful to provide a support structure for supporting the tablet in an upright position, that can be folded-away when the tablet is being used flat.

It is an object of the present invention to provide a convenient support structure for a sketch-on-image tablet and other items.

SUMMARY OF THE INVENTION

According to one aspect of the present invention, there is provided a support structure comprising a body member and first and second arms each pivotally mounted on the body member, the arms being pivotal between an operative position in which the arms extend away from the body member and a folded-away position in which the arms lie close up against the body member with one arm, herein the outermost arm, overlying the other; the arrangement of the arms being such that the arms can be selectively pivoted into their folded-away position with either arm constituting said outermost arm; the support structure further comprising resilient retaining means for retaining the outermost arm in place when the arms are in their folded-away position.

Typically, the support structure will be flee-standing and the body member will include a channel portion defining a channel for receiving the bottom edge portion of a display tablet to be supported by the support structure.

Preferably, the resilient retaining means comprises two first elements provided on respective ones of said arms and two second elements also provided on respective ones of said arms; the first element of one arm being arranged to snap engage with the second element of the other arm when said one arm constitutes said outermost arm. Advantageously, for each arm said first element is a tongue provided at the end of the arm and said second element is formed by a lip of an opening provided in the arm.

The body member is preferably formed with an aperture across which the arms lie when in their folded-away position, the aperture enabling the user to push open said arms out of their folded-away position by action through the aperture. Advantageously, each arm is provided with a boss having a concave underside, the location of the bosses on the arms being such that when the arms are in their folded-away position, the boss of the outermost arm protrudes into the concave underside of the boss of the other arm and the boss of this other arm protrudes into said aperture.

According to another aspect of the present invention, the body member is formed with an aperture across which the arms lie when in their folded away position, the aperture enabling the user to push open the arms out of their folded-away position by action through the aperture.

BRIEF DESCRIPTION OF THE DRAWINGS

A display-tablet support stand embodying the invention will now be described by way of non-limiting example, with reference to the accompanying diagrammatic drawings, in which.

BEST MODE FOR CARRYING OUT THE INVENTION

Figure 1:
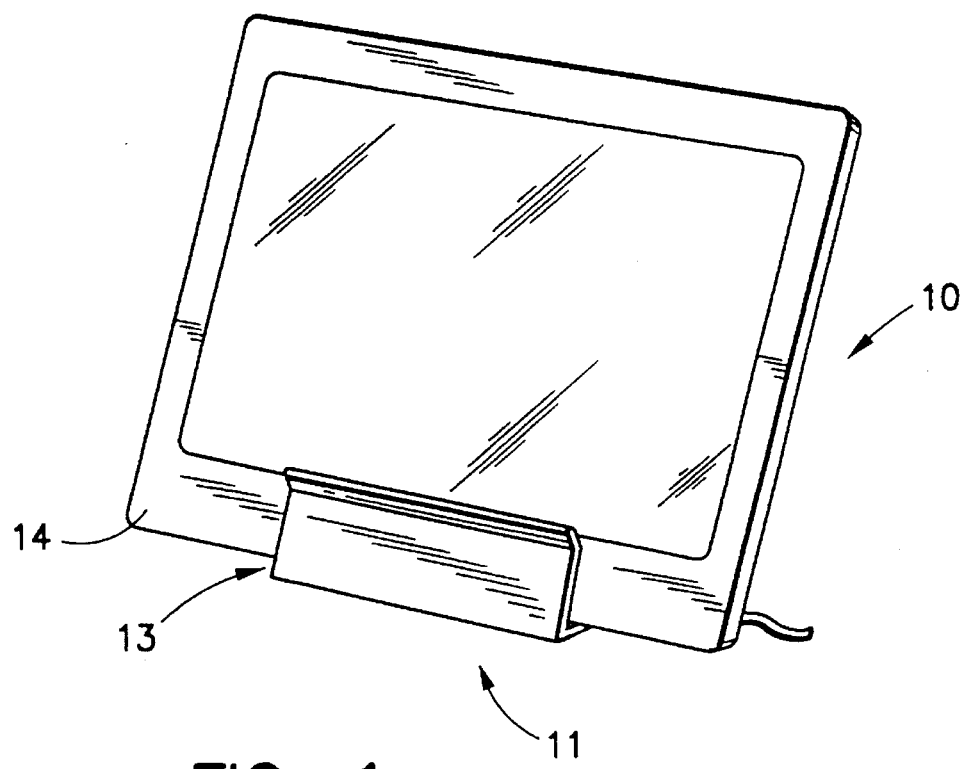
FIG. 1 is a front perspective view of the stand when in use supporting a display tablet.
Figure 2:
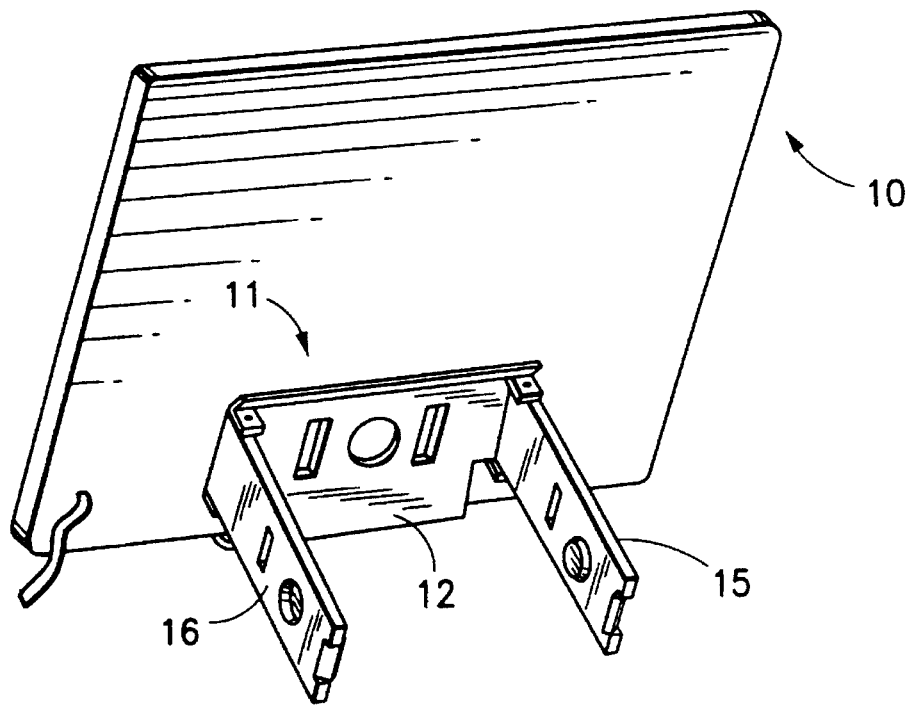
FIG. 2 is a rear perspective view of the stand when in use supporting a display tablet.
Figure 3:
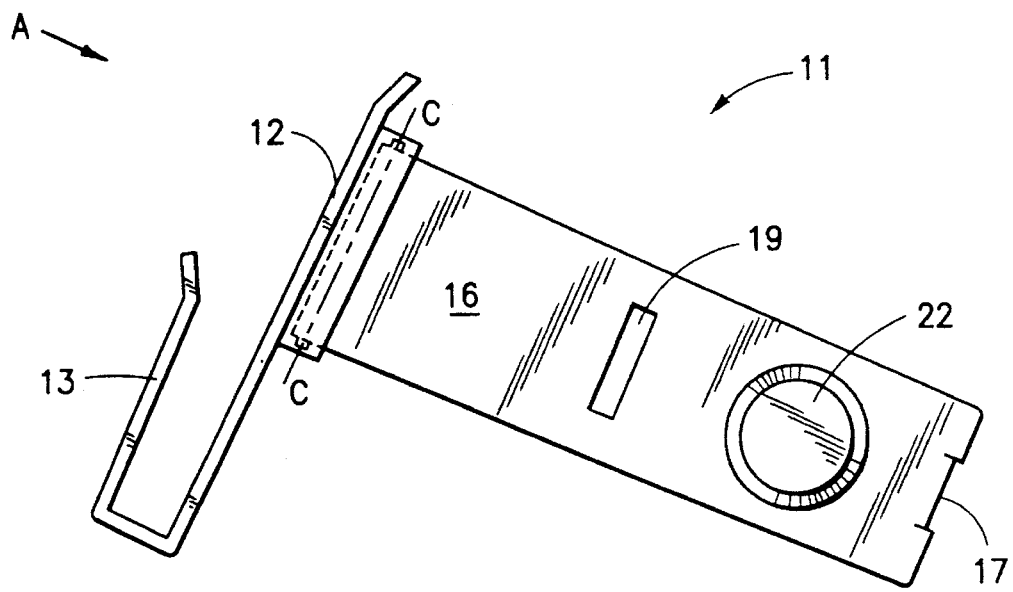
FIG. 3 is a side elevation of the stand showing arms of the stand in their operative position.
Figure 4:
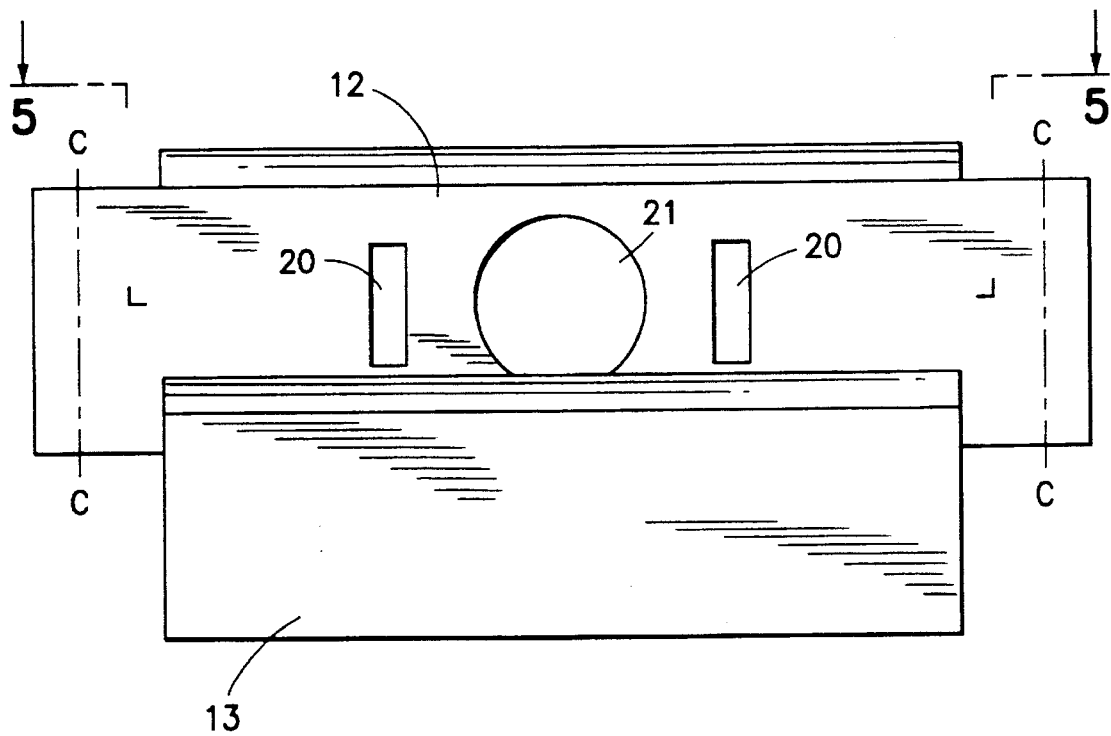
FIG. 4 is a front view of the stand taken in the direction of arrow A of FIG. 3.
Figure 5:
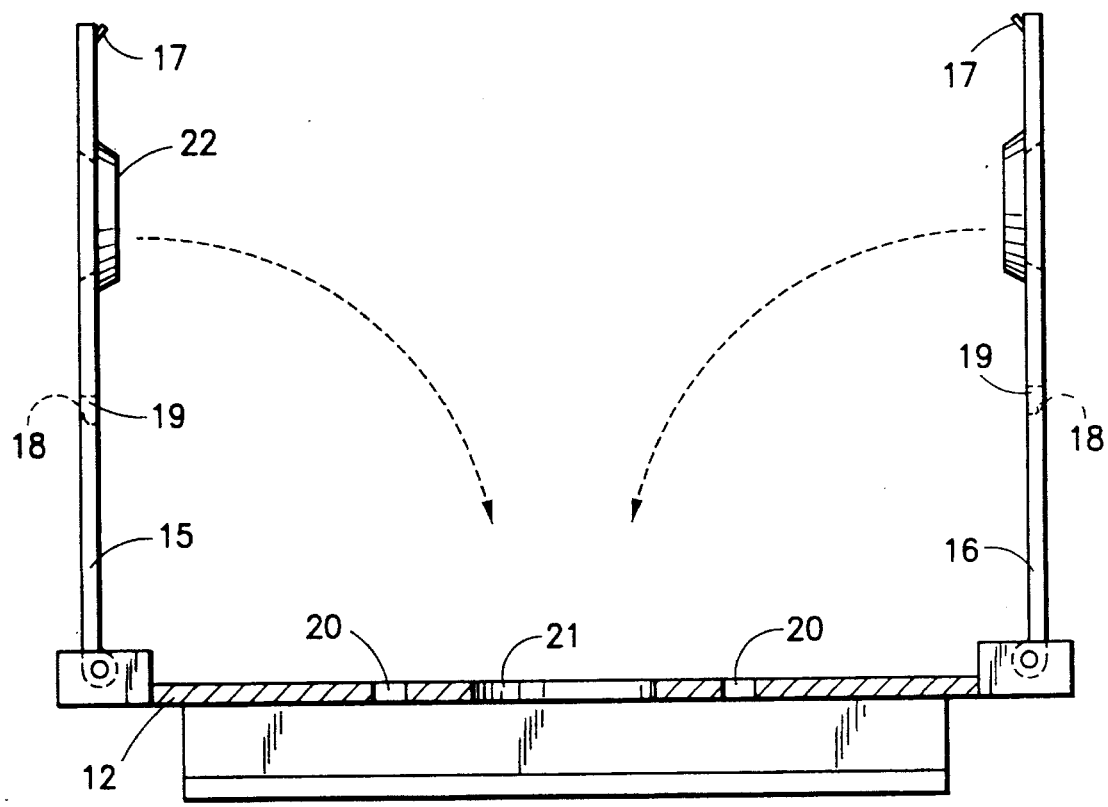
FIG. 5 is top view of the stand, partially in section, taken on line B—B of FIG. 4, the arms of the stand being in their operative position.
Figure 6:
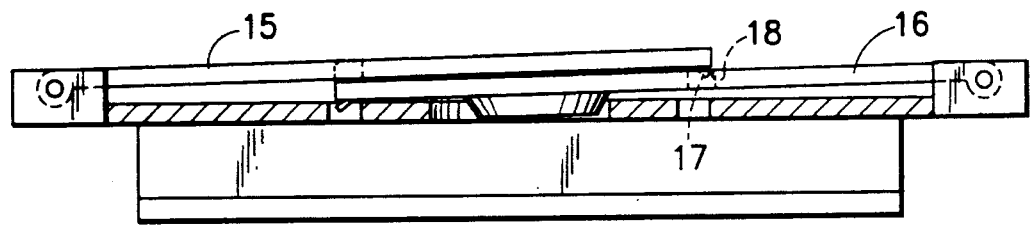
FIG. 6 is a view similar to FIG. 5 but with the arms in a folded-away position, the left arm, as viewed in the figure, overlying the right arm.
Figure 7:
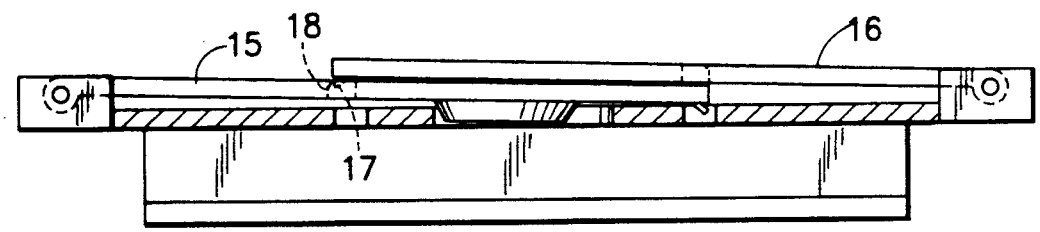
FIG. 7 is a view similar to FIG. 6 but showing the right arm overlying the left arm.

FIGS. 1 and 2 show a display tablet 10 (for example, a sketch-on-image tablet) held in an upright position in a free-standing support stand 11.

The stand 11 has a main body 12 (see FIG. 2) provided with a channel portion 13 for receiving a bottom edge portion 14 of the tablet 10, and two arms 15, 16 pivotally mounted on the main body 12 and which in their operative positions (as shown in FIG. 2) extend away from the body portion to provide, together with the channel portion 13 a stable base for the stand.

FIGS. 3 to 7 show the stand 11 in more detail. Each arm 15, 16 is pivoted adjacent one end on the main body 13, for pivotal movement about a respective axis C—C. The two axes C—C are parallel and are spaced by a distance greater than the distance from each axis to the end of the corresponding arm; this enables the arms 15, 16 to be pivoted from their operative position (see FIG. 5) to a folded-away position (see FIGS. 6, 7) in which they tie close up against the main body 12 with one arm overlying the other. As can be seen from FIGS. 6 and 7, the arms can be pivoted into their folded-away position with either arm outermost, the other arm lying sandwiched between the outermost arm and the main body 12.

Each arm 15, 16 is formed at its free end with a resilient tongue 17. When the arms are in their folded-away position, the tongue 17 of the outermost arm is arranged to snap engage beneath a lip 18 of an opening 19 formed in the other arm (as either arm may constitute the outermost arm, each arm has an opening 19 with a lip 18). In this manner, the arms are retained in their folded-away position.

To enable the arm that is sandwiched between the outermost arm and the main body, to lie close up against the main body when folded away, the main body is formed with an opening 20 positioned to receive the tongue 17 of this arm (again, there are two openings 20 as either arm may be the arm that is sandwiched). Whilst it would be possible to have the tongue 17 of the sandwiched arm snap engage with a lip of the corresponding opening 20, this is not required.

To open out the arms from their folded-away position, it is sufficient to prise arms apart, disengaging the tongue 17 of the outermost arm from the corresponding lip 18.

However, a better solution is to provide a central aperture 21 in the main body 12 through which a user can push open the arms from the front of the stand (seen in FIG. 4) using a digit (finger, thumb). To facilitate this process, each arm is formed with a boss 22. The boss 22 of the arm that is sandwiched when the arms are folded-away, projects into the aperture 21. Each boss 22 has a concave under-surface whereby the boss 22 of the outermost arm can enter into the underside of the boss of the other arm increasing the compactness of the folded-away arrangement of the arms.

It will be appreciated that various modifications can be made to the described stand. For example, the resilient means used to retain the arms in their folded-away position can differ from that shown; thus, an upstanding resilient detent could be provided on the main body for engagement with an edge of at least the outermost arm when the arms are in their folded-away position.

With regard to the aperture 21, whilst this is preferably made large enough for a finger or thumb to be inserted therethrough, an alternative would be to have a smaller aperture and to provide a projection on each arm arranged to extend through the aperture when the arms are in their fold-away position.

Although the illustrated stand is free-standing, a similar arrangement of folding arms could be provided integral with the tablet itself.

It will be appreciated that as well as display tablets, the stand can be used to support other types of item.

I claim:

1. A support structure comprising a body member and first and second arms each pivotally mounted on the body member, the arms being pivotal between an operative position in which the arms extend away from the body member and a folded-away position in which the arms lie close up against the body member with one of said arms, herein the outermost arm, overlying the other of said arms; the arrangement of the arms being such that the arms can be selectively pivoted into their folded-away position with either arm constituting said outermost arm; the support structure further comprising resilient retaining means for retaining the outermost arm in place when the arms are in their folded-away position, said resilient retaining means comprising two first elements provided on respective ones of said arms and two second elements also provided on respective ones of said arms, the first element of one of said arms being arranged to snap engage with the second element of the other of said arms when said one arm constitutes said outermost arm.

2. A support structure according to claim 1, wherein for each arm said first element is a tongue provided at the end of the arm and said second element is formed by an opening provided in the arm, said opening including a lip for engaging said tongue.

3. A support structure according to claim 1, wherein said body member has an aperture across which said arms lie when in their folded-away position, said aperture enabling the user to push open said arms out of their folded-away position by action through said aperture.

4. A support structure according to claim 3, wherein each of said arms is provided with a boss having a concave underside, the location of the bosses on the arms being such that when the arms are in their folded-away position, the boss of the outermost arm protrudes into the concave underside of the boss of the other arm and the boss of the other arm protrudes into said aperture.

5. A support structure according to claim 3, wherein the aperture is of a size enabling a digit of the user's hand to be inserted therethrough.

6. A support structure according to claim 1, wherein the support structure is free-standing and the body member includes a channel portion defining a channel for receiving the bottom edge portion of a display tablet to be supported by the support structure.

7. A support structure comprising a body member and first and second arms each pivotally mounted on the body member, the arms being pivotal between an operative position in which the arms extend away from the body member and a folded-away position in which the arms lie close up against the body member with one of said arms overlying the other of said arms; the support structure further comprising resilient means for retaining the arms in their folded-away position, and the body member being formed with an aperture across which said arms lie when in their folded-away position, said aperture enabling the user to push open said arms out of their folded-away position by action through said aperture.

* * * * *